(12) United States Patent
Gau

(10) Patent No.: US 8,090,260 B2
(45) Date of Patent: Jan. 3, 2012

(54) LIGHT SOURCE AND DETECTING DEVICE THEREOF

(75) Inventor: Song Yueh Gau, Chupei (TW)

(73) Assignee: Liverage Technology Inc., Hsinchu (TW)

( * ) Notice: Subject to any disclaimer, the term of this patent is extended or adjusted under 35 U.S.C. 154(b) by 675 days.

(21) Appl. No.: 12/078,544

(22) Filed: Apr. 1, 2008

(65) Prior Publication Data

US 2011/0025514 A1 Feb. 3, 2011

(51) Int. Cl.
*H04B 10/08* (2006.01)
*H04B 17/00* (2006.01)
(52) U.S. Cl. ............. 398/38; 398/25; 398/28; 398/32
(58) Field of Classification Search .......... 398/38, 398/25, 28, 32
See application file for complete search history.

(56) References Cited

U.S. PATENT DOCUMENTS 5,521,701 A * 5/1996 Felger et al. ............ 356/218
2008/0079490 A1* 4/2008 Nguyen et al. ........... 330/152
* cited by examiner

*Primary Examiner* — Kenneth N Vanderpuye
*Assistant Examiner* — Daniel Dobson
(74) *Attorney, Agent, or Firm* — Guice Patents PLLC

(57) ABSTRACT

The present invention relates to a light source and detecting device thereof includes: a housing; a printed circuit board; an optical fiber connector; a laser diode; a laser driving module; a light coupling device; a light detecting module; an analog-to-digital converter; a micro controlling device; a stroke switch and a displaying device; when the stroke switch is pressed, the light detecting module is activated according to a determination made by the micro controlling device then a light signal coupled by the light coupling device is detected by the light detecting module, then the signal is displayed on the displaying device after being converted by the analog-to-digital converter or the laser diode is driven by the laser driving module and a laser source is therefore emitted.

12 Claims, 3 Drawing Sheets

LIGHT SOURCE AND DETECTING DEVICE THEREOF

BACKGROUND OF THE INVENTION

1. Field of the Invention

The present invention relates to a light source and detecting device thereof, more particularly to a light source and detecting device thereof that is used for measuring invisible light used for communication and for emitting a laser source, and is small in volume and portable.

2. Description of Related Art

A conventional light source and detecting device thereof used for measuring invisible light used for communication is expensive and not easy to carry around. One end of the device has to be coupled with an optical fiber, then a measurement is done by the light source and detecting device thereof for obtaining information that whether the detected communication signal is good or not. However, to ensure the quality of wireless communication, skilled people have to travel to various locations for measuring and maintaining. But the above mentioned light source and detecting device thereof is big in volume, not easy to carry around and is expensive, and can not provide the skilled people convenient and real-time operations.

The optical fiber is expensive and fragile, so it is often disposed within a protection tube or a culvert for avoiding from external destructions. But the diameters of the protection tube or the culvert described above are not big in sizes and a conventional detecting device for an optical fiber is big in volume and is not convenient to carry around, so when the optical fiber is malfunction, skilled people are not able to use a large detecting device for an optical fiber due to the size limitation.

So a novel light source and detecting device thereof is needed for overcoming the above mentioned disadvantages.

SUMMARY OF THE INVENTION

One object of the present invention is to provide a light source and detecting device thereof that is small in volume and is portable.

Another object of the present invention is to provide a light source and detecting device thereof, which is equipped with a changeover switch capable of being adjusted according to a wavelength of a light signal, the measurement precision is therefore increased.

One another object of the present invention is to provide a light source and detecting device thereof, which is equipped with a changeover switch capable of being adjusted when needed and a continuous laser or a laser pulse is therefore emitted.

For achieving the above mentioned objects, the light source and detecting device thereof provided by the present invention includes: a housing having an accommodating space and one end of the housing is provided with a first opening, a second opening and a through hole; a printed circuit board received in the accommodating space for carrying following units; an optical fiber connector, one end thereof is exposed outside of the first opening and the optical fiber connector is provided with a transmitting end and a receiving end for being coupled with an optical fiber; a laser diode coupled with the optical fiber connector; a laser driving module coupled with the laser diode for driving the laser diode; a light coupling device provided in the optical fiber connector; a light detecting module coupled with the light coupling device for detecting a light signal coupled by the light coupling device and transferring the light signal to an analog signal; an analog-to-digital converter coupled with the light detecting module for receiving the analog signal and converting the analog signal to a digital signal; a micro controlling device coupled with the laser driving module, the analog-to-digital converter and the light detecting module; a stroke switch coupled with the micro controlling device and exposed outside of the through hole; and a displaying device coupled with the micro controlling device and exposed outside of the second opening; when the stroke switch is pressed, the light detecting module is activated according to a determination made by the micro controlling device then a light signal coupled by the light coupling device is detected by the light detecting module, the light signal is displayed on the displaying device after being converted by the analog-to-digital converter or the laser diode is driven by the laser driving module and a laser source is therefore emitted.

DETAILED DESCRIPTION OF THE PREFERRED EMBODIMENT

Figure 1:
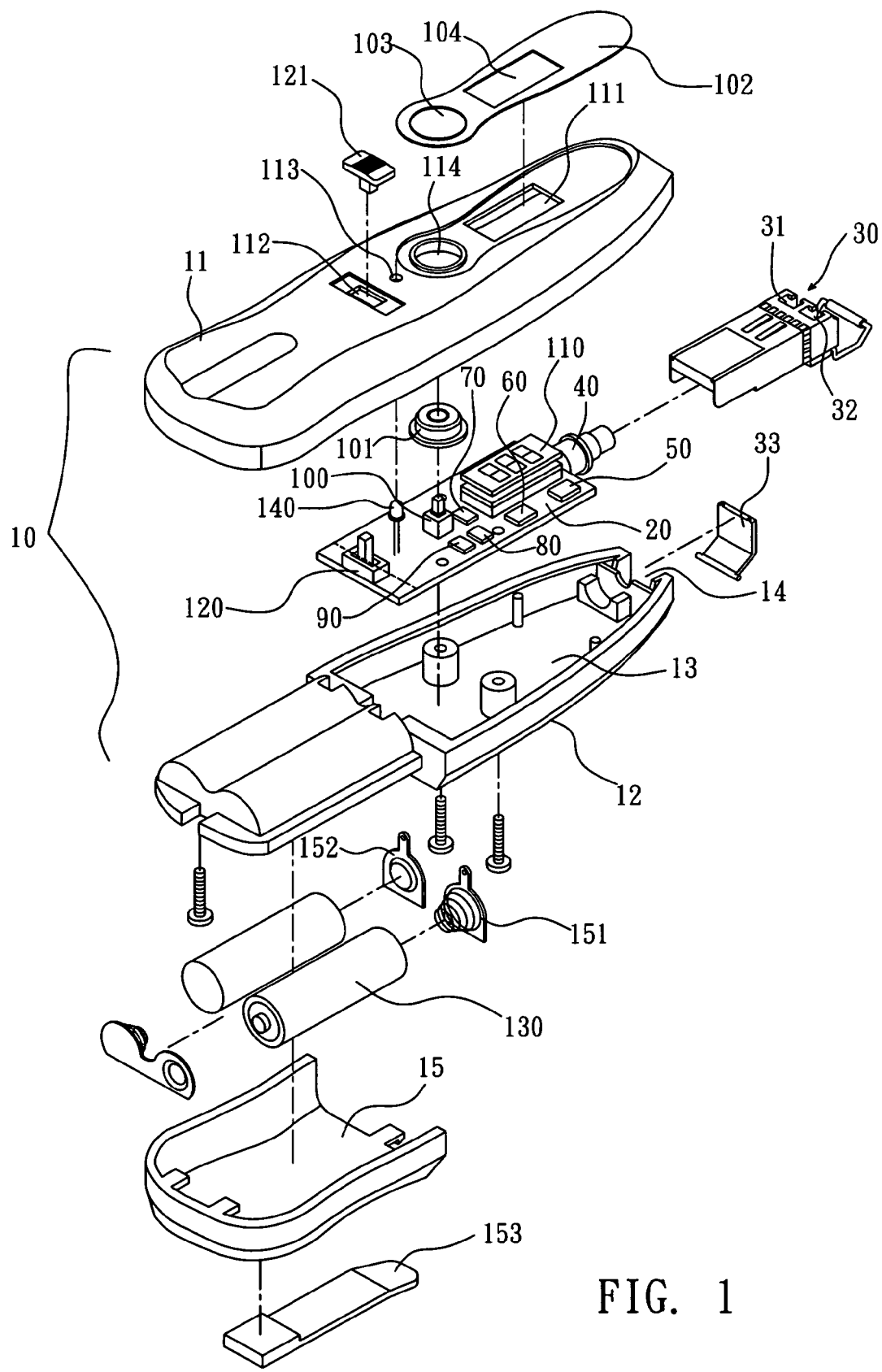
FIG. 1 is a schematic exploded view of a light source and detecting device thereof of a preferred embodiment of the present invention.
Figure 2:
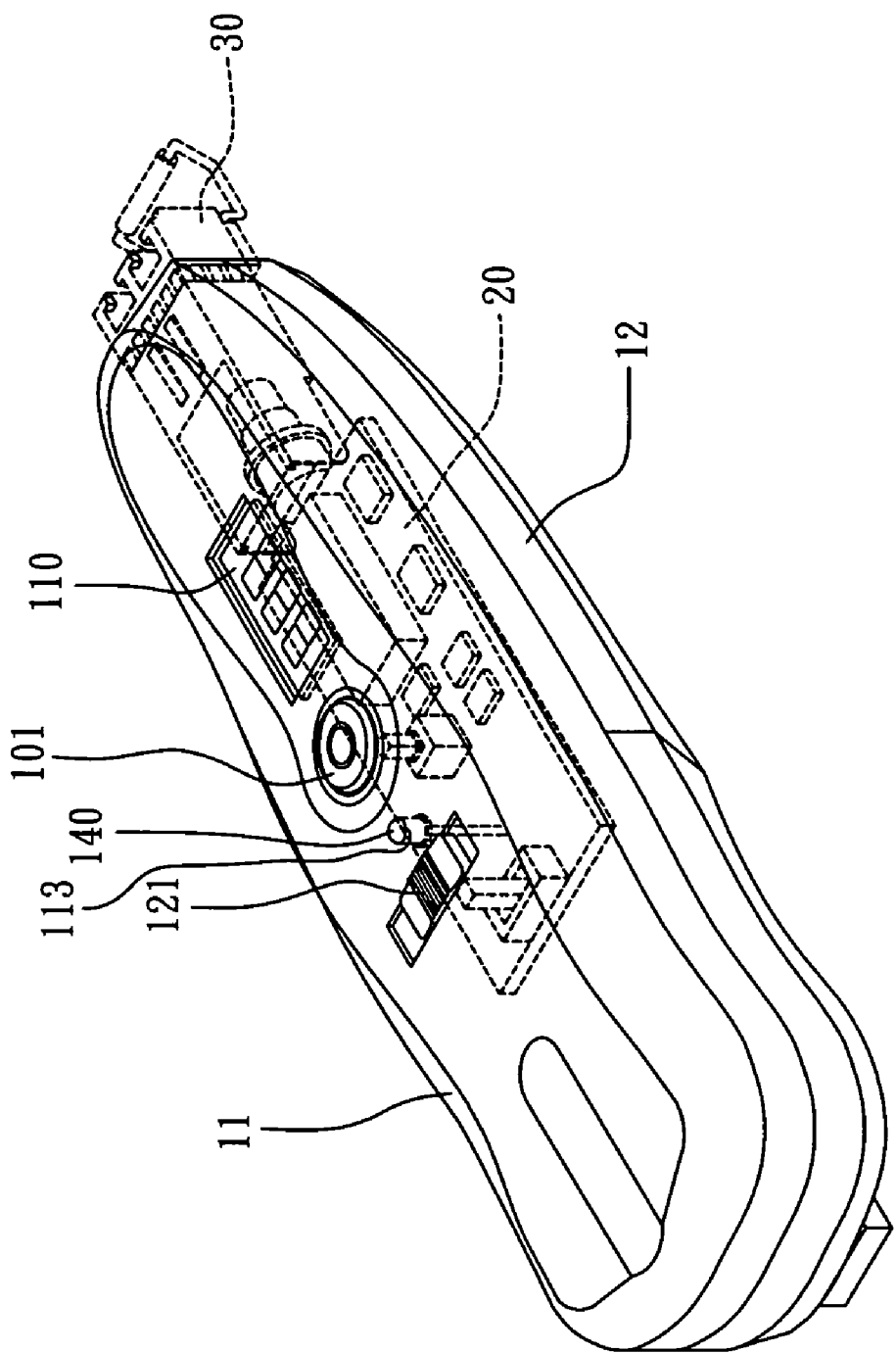
FIG. 2 is a schematic view of the assembly of the light source and detecting device thereof of a preferred embodiment of the present invention.
Figure 3:
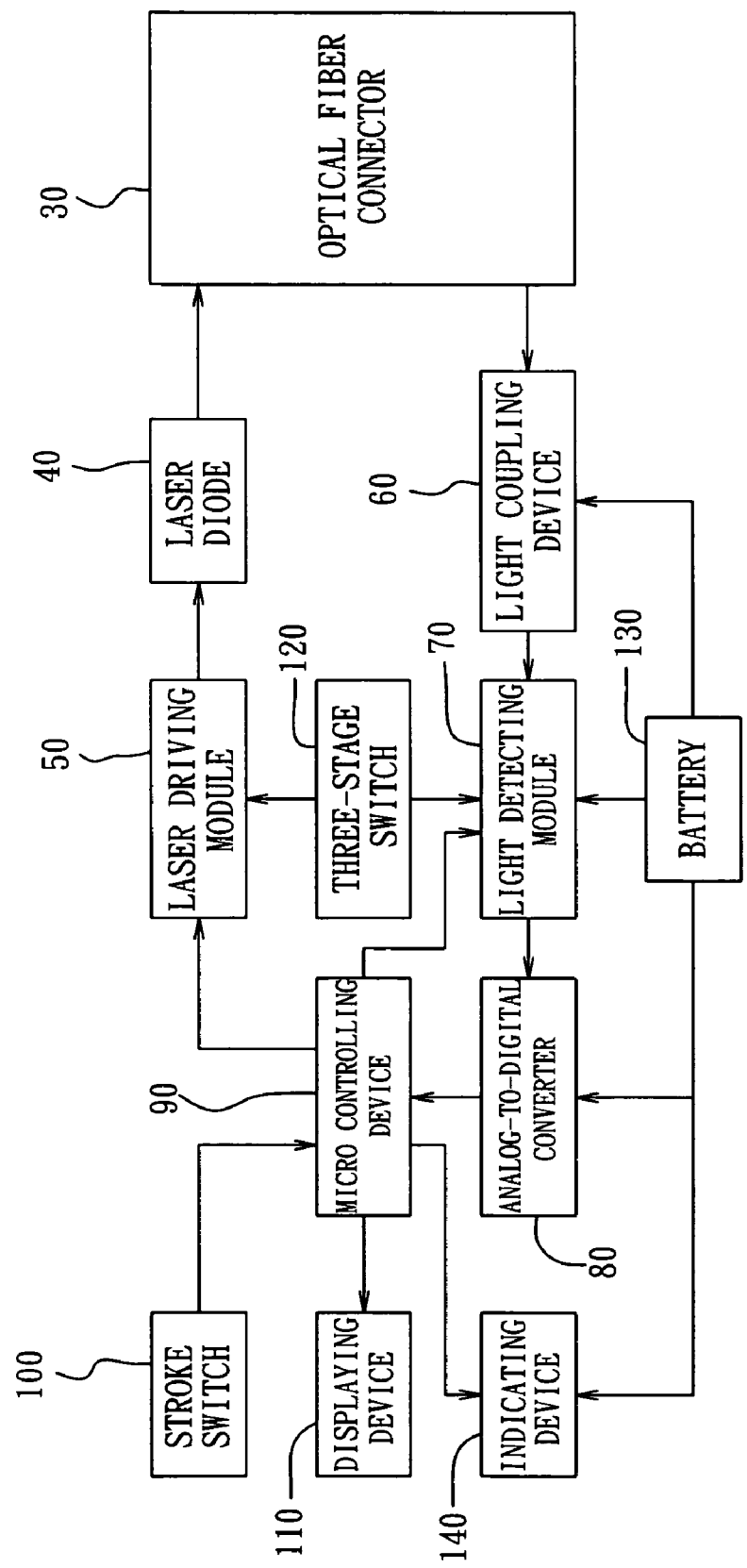
FIG. 3 is a schematic block diagram of the light source and detecting device thereof of a preferred embodiment of the present invention.

Referring to FIG. 1 to FIG. 3, wherein FIG. 1 is a schematic exploded view of a light source and detecting device thereof of a preferred embodiment of the present invention; FIG. 2 is a schematic view of the assembly of the light source and detecting device thereof of a preferred embodiment of the present invention; FIG. 3 is a schematic block diagram of the light source and detecting device thereof of a preferred embodiment of the present invention.

As shown in figures, the light source and detecting device thereof provided by the present invention comprises: a housing 10, a printed circuit board 20, an optical fiber connector 30, a laser diode 40, a laser driving module 50, a light coupling device 60, a light detecting module 70, an analog-to-digital converter 80, a micro controlling device 90, a stroke switch 100 and a displaying device 110.

The housing 10 is made of insulating materials, e.g. but not limited to plastic materials, the housing 10 is further provided with a top housing member 11 and a bottom housing member 12, an accommodating space 13 is formed between the top housing member 11 and the bottom housing member 12, a first opening 14 is provided at the front ends of the top housing member 11 and the bottom housing member 12, and the top housing member 11 has a second opening 111, a third opening 112, a fourth opening 113 and a through hole 114.

The printed circuit board 20 is received in the accommodating space 13 for carrying the optical fiber connector 30, the laser diode 40, the laser driving module 50, the light detecting module 70, the analog-to-digital converter 80, the micro controlling device 90, the stroke switch 100 and the displaying device 110.

One end of the optical fiber connector 30 is exposed outside of the first openings 14 and the optical fiber connector 30 is provided with a transferring end 31 and a receiving end 32 for being coupled with an optical fiber (not shown), the optical fiber is used for transferring invisible light signals (hereinafter is referred to light signals) or light signals for communication to be measured.

The optical fiber connector 30 is a SC/LC/FC/ST/or MC optical fiber connector, wherein the SC optical fiber connector is a Simplex Connector, the LC optical fiber connector is a Lucent Connector, the FC optical fiber connector is a Fiber Connector, and the above mentioned SC/LC/FC/ST/and MC optical fiber connectors are thinned optical fiber connectors. The outer end of the optical fiber connector 30 is further provided with an outer cover 33 disposed at the outer side of the first opening 14 for protecting the optical fiber connector 30.

The laser diode 40 is disposed on the printed circuit board 20 and coupled with the laser driving module 50 and can be driven by the laser driving module 50 to emit a laser beam, the wavelength of the laser beam is e.g. but not limited to 650 nm.

The laser driving module 50 is disposed on the printed circuit board 20 and coupled with the laser diode 40 for driving the laser diode 40.

The light coupling device 60 is provided in the optical fiber connector 30 for coupling a light signal in the optical fiber with the light detecting module 70.

The light detecting module 70 is disposed on the printed circuit board 20 for detecting the light signal coupled by the light coupling device 60 and transferring the light signal to an analog signal.

The analog-to-digital converter 80 is disposed on the printed circuit board 20 and coupled with the light detecting module 70 for receiving the analog signal and transferring the analog signal to a digital signal and processing a calculation.

The micro controlling device 90 is disposed on the printed circuit board 20 and coupled with the laser driving module 50, the light detecting module 70 and the analog-to-digital converter 80. This art is the core of the present invention which will be described in details later.

The stroke switch 100 is disposed on the printed circuit board 20 and coupled with the micro controlling device 90 and exposed outside of the through hole 114, for being pressed to activate the laser driving module 50 or the light detecting module 70. The outer end of the stroke switch 100 is further provided with a pressing member 101 that is sleeved on the stroke switch 100, for allowing a user press the stroke switch 100. The outer end of the pressing member 101 is further provided with a decoration sheet 102 having a round hole 103 and a square hole 104, wherein the round hole 103 is served to allow the pressing member 101 expose outside.

The displaying device 110 is coupled with the micro controlling device 90 and is exposed outside of the second opening 111 and the square hole 104, for displaying the calculation value of the light signal. The displaying device 110 can be, but not limited to, a seven-stage LED monitor or a liquid crystal monitor. The display device 110 can have a two-digit or a three-digit seven-stage numerals, when the display device 110 has the two-digit seven-stage numerals, the displaying device 110 can be used to detect 1310 nm/1490 nm/1550 nm via a single mode detection within a range of −30 dBm~−6 dBm, when the display device 110 has the three-digit seven-stage numerals, the displaying device 110 can be used to detect 1310 nm/1490 nm/1550 nm via a single mode detection within a range of −30 dBm~−3 dBm.

The light source and detecting device thereof provided by the present invention is further provided with a three-stage switch 120 respectively coupled with the light detecting module 70 and the laser driving module 50 and exposed outside of the third opening 112, so the wavelength of the light signal that can be detected by the light detecting module 70 can be switched to 850 nm, 1310 nm or 1550 nm, the detectable wavelength can be adjusted according to the wavelength of the light signal, or the laser driving module 50 can be switched to either emit a continuous laser beam or a laser pulse, the wavelength of the laser beam is 650 nm so the calculation precision of the light source and detecting device thereof provided by the present invention can be increased. The outer end of the three-stage switch 120 is further provided with a stirring member 121 sleeved on the three-stage switch 120 for allowing a user stir the three-stage switch 120.

The light source and detecting device thereof provided by the present invention is further provided with a battery 130, the other end of the accommodating space 13 is provided with a battery chamber 15, the battery 130 is received in the battery chamber 15 and is coupled with the light coupling device 60, the light detecting module 70, the analog-to-digital converter 80, the stroke switch 100 and the displaying device 110 via electrodes 151, 152, for supplying needed power, the battery 130 can be a primary battery or a rechargeable battery.

The bottom end of the battery chamber 15 is further provided with a clamping section 153 for allowing a skilled person clamp the light source and detecting device thereof provided by the present invention in a pocket of the skilled person.

The bottom housing member 12 is further provided with an indicating device 140, e.g. but not limited to a multi-color LED, coupled with the micro controlling device 90 and exposed outside of the fourth-opening 113, for indicating the operation status of the light source and detecting device thereof provided by the present invention. When the electric capacity of the battery 130 detected by the micro controlling device 90 is enough to operate normally, the indicating device 140 is driven to display a green light; when the electric capacity of the battery 130 detected by the micro controlling device 90 is low, the indicating device 140 is driven to display a red light for reminding a user to replace the battery 130.

After assembled, continuously pressing the stroke switch 100 for a certain time, e.g. continuously pressing for 3 seconds or continuously pressing for 6 seconds, when pressing for 3 seconds, the micro controlling device 90 can, but not limited to, activate the laser driving module 50 for processing an optical fiber detection or emitting a laser; when pressing for 6 seconds, the micro controlling device 90 can, but not limited to, activate the light detecting module 70 for processing a laser detection.

For instance, when a user continuously presses the stroke switch 100 for 3 seconds, the micro controlling device 90 would determine whether the user has chosen the function of detecting optical fiber or emitting laser, in other words the laser driving modules 50 is activated; then the user operates the three-stage switch 120, so the laser diode 40 is driven by the laser driving module 50 and a continuous laser beam or a laser pulse is therefore emitted via the transferring end 31 for serving as a laser source, and the wavelength of the laser beam is 650 nm under the mode of detecting wavelength as 850 nm (1310 nm or 1550 nm, 850 nm is used for illustration in the embodiment but not acts as a limit for the detecting wavelength); or the optical fiber (not shown) is respectively connected to the transferring end 31 and the receiving end 32 of the optical fiber connector 30, so that the light signal coupled by the light coupling device 60 can be detected by the light detecting module 70, the light signal is shown on the displaying device 110 after being converted by the analog-to-digital converter 80 and being calculated by the micro controlling device 90, so according to the value shown on the displaying device 110 a skilled person can know the intensity of the light signal in the optical fiber and operations of maintenance or adjustment can be proceeded.

When the user presses the stroke switch 100 for 6 seconds, the micro controlling device 90 would determine that the user has chosen the function of detecting laser, in other words the light detecting module 70 is activated; then the user operates the three-stage switch 120, so light detecting module 70 can detect laser signals with wavelength of 850 nm, 1310 nm, or 1550 nm; then the optical fiber is connected to the receiving end 32 of the optical fiber connector 30, so that the intensity of the light signal coupled by the light coupling device 60 can be detected by the light detecting module 70, and the intensity of the light signal is shown on the displaying device 110 after being converted by the analog-to-digital converter 80 and being calculated by the micro controlling device 90, so according to the value shown on the displaying device 110 a skilled person can know the intensity of the light signal in the optical fiber and operations of maintenance or adjustment can be proceeded.

The present invention provides a light source and detecting device thereof that is small in volume, easy to carry around and has a three-stage switch, and that can emit a continuous laser beam or a laser pulse or process an optical fiber detection and a laser detection in which the wavelength is adjustable according to the wavelength of the light signal, so the calculation precision of the light source and detecting device thereof provided by the present invention is increased.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A light source and detecting device thereof, comprises:
    a housing having an accommodating space and one end of the housing has a first opening, a second opening and a through hole;
    a printed circuit board received in the accommodating space for carrying following units;
    an optical fiber connector, one end thereof is exposed outside of the first opening and the optical fiber connector is provided with a transmitting end and a receiving end for being coupled with an optical fiber;
    a laser diode coupled with the optical fiber connector;
    a laser driving module coupled with the laser diode for driving the laser diode;
    a light coupling device provided in the optical fiber connector;
    a light detecting module coupled with the light coupling device for detecting a light signal coupled by the light coupling device and converting the light signal to an analog signal;
    an analog-to-digital converter coupled with the light detecting module for receiving the analog signal and converting the analog signal to a digital signal;
    a micro controlling device coupled with the laser driving module, the analog-to-digital converter and the light detecting module;
    a stroke switch coupled with the micro controlling device and exposed outside of the through hole; and
    a displaying device coupled with the micro controlling device and exposed outside of the second opening;
    wherein, when the stroke switch is pressed, the light detecting module is activated according to a determination made by the micro controlling device then a light signal coupled by the light coupling device is detected by the light detecting module, the signal is then displayed on the displaying device after being converted by the analog-to-digital converter or the laser diode is driven by the laser driving module and a laser source is therefore emitted;
    wherein the light detecting module is directly electrically connected to the light coupling device, the analog-to-digital converter, and the micro controlling device;
    wherein the laser driving module is directly electrically connected to the laser diode and the micro controlling device.

2. The light source and detecting device thereof as claimed in claim 1, wherein the housing is made of insulating materials and is further provided with a top housing member and a bottom housing member, the accommodating space is formed between the top housing member and the bottom housing member, the first opening is provided in the front ends of the top housing member and the bottom housing member, and the through hole is provided on the top housing member.

3. The light source and detecting device thereof as claimed in claim 2, wherein the insulating material is plastic, the top housing member is further provided with a third opening and a fourth opening, and the other end of the accommodating space is further provided with a battery chamber having two electrodes therein.

4. The light source and detecting device thereof as claimed in claim 3, further comprising a three-stage switch respectively coupled with the light detecting module and the laser driving module and exposed outside of the third opening, the wavelength of the light signal that is detected by the light detecting module is switched to a wavelength selected from a group consisting of 850 nm, 1310 nm, and 1550 nm, the laser driving module is switched to emit a beam selected from a group consisting of a continuous laser beam and a laser pulse, the wavelength of the laser is 650 nm;
    wherein the light detecting module is directly electrically connected to the light coupling device, the analog-to-digital converter, the micro controlling device, and the three-stage switch;
    wherein the laser driving module is directly electrically connected to the laser diode, the micro controlling device, and the three-stage switch.

5. The light source and detecting device thereof as claimed in claim 1, wherein the outer end of the stroke switch is further provided with a pressing member and a decoration sheet, wherein the pressing member is sleeved on the stroke switch for allowing a user to press the stroke switch; the decoration sheet is further provided with a round hole and a square hole, wherein the round hole is served to allow the pressing member expose outside and the square hole is served to allow the displaying device expose outside.

6. The light source and detecting device thereof as claimed in claim 3, wherein the bottom end of the battery chamber is further provided with a clamping section.

7. The light source and detecting device thereof as claimed in claim 1, wherein the optical fiber connector is selected from a group consisting of a Simplex Connector (SC), a Lucent Connector (LC), a Fiber connector (FC), a ST connector, and a MC connector.

8. The light source and detecting device thereof as claimed in claim 3, further comprising a battery and the battery is received in the battery chamber and is coupled with the light coupling device, the light detecting module, the analog-todigital converter, the stroke switch and the displaying device via the electrodes for supplying needed power.

9. The light source and detecting device thereof as claimed in claim 1, wherein the displaying device is selected from a group consisting of a seven-stage LED monitor and a liquid crystal monitor.

10. The light source and detecting device thereof as claimed in claim 1, wherein the displaying device is a liquid crystal monitor.

11. The light source and detecting device thereof as claimed in claim 10, wherein the display device has numerals selected from a group consisting of a two-digit and a three-digit seven-stage numerals, when the display device has the two-digit seven-stage numerals, the displaying device is used to detect 1310 nm/1490 nm/1550 nm via a single mode detection within a range of −30 dBm~−6 dBm; when the display device has the three-digit seven-stage numerals, the displaying device is used to detect 1310 nm/1490 nm/1550 nm via a single mode detection within a range of −30 dBm~−3 dBm.

12. The light source and detecting device thereof as claimed in claim 8, further comprising an indicating device coupled with the micro controlling device and exposed outside of the fourth opening, the indicating device is used to show the operation status, when operated normally the indicating device shows a green light, when the capacity of the battery is low the indicating device shows a red light.

\* \* \* \* \*